(12) United States Patent
Abe et al.

(10) Patent No.: US 11,776,751 B2
(45) Date of Patent: Oct. 3, 2023

(54) MULTILAYER CERAMIC CAPACITOR

(71) Applicant: Murata Manufacturing Co., Ltd., Nagaokakyo (JP)

(72) Inventors: Yoshiyuki Abe, Nagaokakyo (JP); Kazuhisa Uchida, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 51 days.

(21) Appl. No.: 17/591,628

(22) Filed: Feb. 3, 2022

(65) Prior Publication Data

US 2022/0262568 A1 Aug. 18, 2022

(30) Foreign Application Priority Data

Feb. 17, 2021 (JP) ................ 2021-023429

(51) Int. Cl.
*H01G 4/12* (2006.01)
*H01G 4/008* (2006.01)
*H01G 4/232* (2006.01)
*H01G 4/30* (2006.01)

(52) U.S. Cl.
CPC ......... *H01G 4/1227* (2013.01); *H01G 4/0085* (2013.01); *H01G 4/2325* (2013.01); *H01G 4/30* (2013.01)

(58) Field of Classification Search
CPC .... H01G 4/1227; H01G 4/0085; H01G 4/012; H01G 4/30; H01G 4/2325
See application file for complete search history.

(56) References Cited

U.S. PATENT DOCUMENTS

| 6,930,876 B1* | 8/2005 | Noguchi | H01G 4/12 361/321.5 |
| 9,129,750 B2* | 9/2015 | Kim | H01G 4/1209 |
| 2005/0117274 A1* | 6/2005 | Miyauchi | H01G 4/12 361/321.2 |
| 2005/0180092 A1* | 8/2005 | Hibi | H01G 4/30 361/311 |

(Continued)

FOREIGN PATENT DOCUMENTS

JP 2019-197790 A 11/2019

*Primary Examiner* — Michael P McFadden
(74) *Attorney, Agent, or Firm* — KEATING & BENNETT, LLP

(57) ABSTRACT

A multilayer ceramic capacitor includes first dielectric ceramic layers each with a thickness of about 0.48 μm or more and about 0.50 μm or less in the lamination direction, and additional dielectric ceramic layers each with a thickness of about 10 μm or more and about 15 μm or less in the width direction. A number of dielectric particles in each first dielectric ceramic layer in a thickness direction is three or more and six or less. A number of dielectric particles in each additional dielectric ceramic layer in a thickness direction is 100 or more and 150 or less. When the number of dielectric particles in each of first dielectric ceramic layer is $N_T$, and the number of dielectric particles in each additional dielectric ceramic layer is $N_W$, a ratio of $N_T$ to $N_W$ is about 1:23.08 or more and about 1:46.15 or less.

11 Claims, 5 Drawing Sheets

(56) References Cited

U.S. PATENT DOCUMENTS

| | | | |
|---|---|---|---|
| 2006/0208575 A1* | 9/2006 | Orimo | H01G 4/30 307/109 |
| 2009/0201628 A1* | 8/2009 | Kagata | H01G 4/1209 29/25.42 |
| 2011/0141655 A1* | 6/2011 | Jeong | H01G 4/005 361/306.3 |
| 2011/0235233 A1* | 9/2011 | Ando | H01G 4/1227 361/301.4 |
| 2012/0327556 A1* | 12/2012 | Ahn | H01G 4/12 361/321.2 |
| 2014/0071586 A1* | 3/2014 | Park | H01G 4/30 156/60 |
| 2014/0301013 A1* | 10/2014 | Kim | H01G 4/01 29/25.03 |
| 2015/0070817 A1* | 3/2015 | Morita | C04B 35/465 361/301.4 |
| 2018/0240592 A1* | 8/2018 | Morita | H01G 4/30 |
| 2019/0035554 A1* | 1/2019 | Inomata | H01G 4/12 |
| 2019/0348222 A1 | 11/2019 | Kato | |
| 2020/0312569 A1* | 10/2020 | Uchida | H01G 4/30 |
| 2020/0402717 A1* | 12/2020 | Lee | H01G 4/30 |
| 2021/0005382 A1* | 1/2021 | Park | H01G 4/012 |
| 2021/0166881 A1* | 6/2021 | Kim | H01G 4/30 |
| 2022/0139632 A1* | 5/2022 | Kim | H01G 4/1227 361/321.4 |

\* cited by examiner

MULTILAYER CERAMIC CAPACITOR

CROSS REFERENCE TO RELATED APPLICATIONS

This application claims the benefit of priority to Japanese Patent Application No. 2021-023429 filed on Feb. 17, 2021. The entire contents of this application are hereby incorporated herein by reference.

BACKGROUND OF THE INVENTION

1. Field of the Invention

The present invention relates to a multilayer ceramic capacitor.

2. Description of the Related Art

Conventionally, a multilayer ceramic capacitor has been known which includes a multilayer body in which dielectric ceramic layers and the internal electrode layers are stacked, and external electrodes provided on both end portions of this multilayer body. In relation to such a multilayer ceramic capacitor, a multilayer ceramic capacitor has been known which includes a side margin portion that protects the side surface of the multilayer body and prevents the internal electrode layers at the side surface from being connected to the external electrode layer (for example, refer to Japanese Unexamined Patent Application, Publication No. 2019-197790).

It is necessary to reduce the thickness of the dielectric ceramic layers and increase the number of laminated layers in order to achieve a multilayer ceramic capacitor with high capacitance, and at the same time, reductions in size and in thickness of the multilayer ceramic capacitor has also been demanded. However, when the side margin portion is reduced in thickness for the purpose of reducing size, moisture resistance is reduced, and thus the reliability is degraded. Therefore, it is difficult to achieve both high capacitance and reliability.

SUMMARY OF THE INVENTION

Preferred embodiments of the present invention provide multilayer ceramic capacitors that each achieve high capacitance and reliability, while achieving size reduction.

A preferred embodiment of the present invention provides a multilayer ceramic capacitor including a multilayer body including dielectric ceramic layers and internal electrode layers which are laminated in a lamination direction, and external electrodes each connected to the internal electrode layers, wherein the multilayer body further includes a first main surface and a second main surface opposing each other in the lamination direction, a first side surface and a second side surface opposing in a width direction which is perpendicular or substantially perpendicular to the lamination direction, a first end surface and a second end surface opposing each other in a length direction perpendicular or substantially perpendicular to the lamination direction and the width direction, an inner layer portion including the internal electrode layers laminated alternately with the dielectric ceramic layers interposed therebetween, and outer layer portions that sandwich the inner layer portion in the lamination direction, the dielectric ceramic layers includes first dielectric ceramic layers laminated with the internal electrode layers interposed therebetween in the inner layer portion, and second dielectric ceramic layers defining and functioning as the outer layer portions, the multilayer ceramic capacitor further includes additional dielectric ceramic layers respectively on the first side surface and the second side surface and sandwiching the inner layer portion and the outer layer portions in the width direction, the first dielectric ceramic layers each have a thickness of about 0.48 µm or more and about 0.50 µm or less in the lamination direction, the additional dielectric ceramic layers each have a thickness of about 10 µm or more and about 15 µm or less in the width direction, a number of dielectric particles in each of the first dielectric ceramic layers in a thickness direction corresponding to the lamination direction is three or more and six or less, a number of dielectric particles in each of the additional dielectric ceramic layers in a thickness direction corresponding to the width direction is 100 or more and 150 or less, and when a number of dielectric particles in each of the first dielectric ceramic layers in a thickness direction corresponding to the lamination direction is defined as $N_T$, and a number of dielectric particles present in each of the additional dielectric ceramic layers in a thickness direction corresponding to the width direction is defined as $N_W$, a ratio of $N_T$ to $N_W$ is about 1:23.08 or more and about 1:46.15 or less.

According to preferred embodiments of the present application, it is possible to provide multilayer ceramic capacitors which each achieve both high capacitance and reliability, while achieving the reduction in size.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail below with reference to the drawings.

Figure 1:
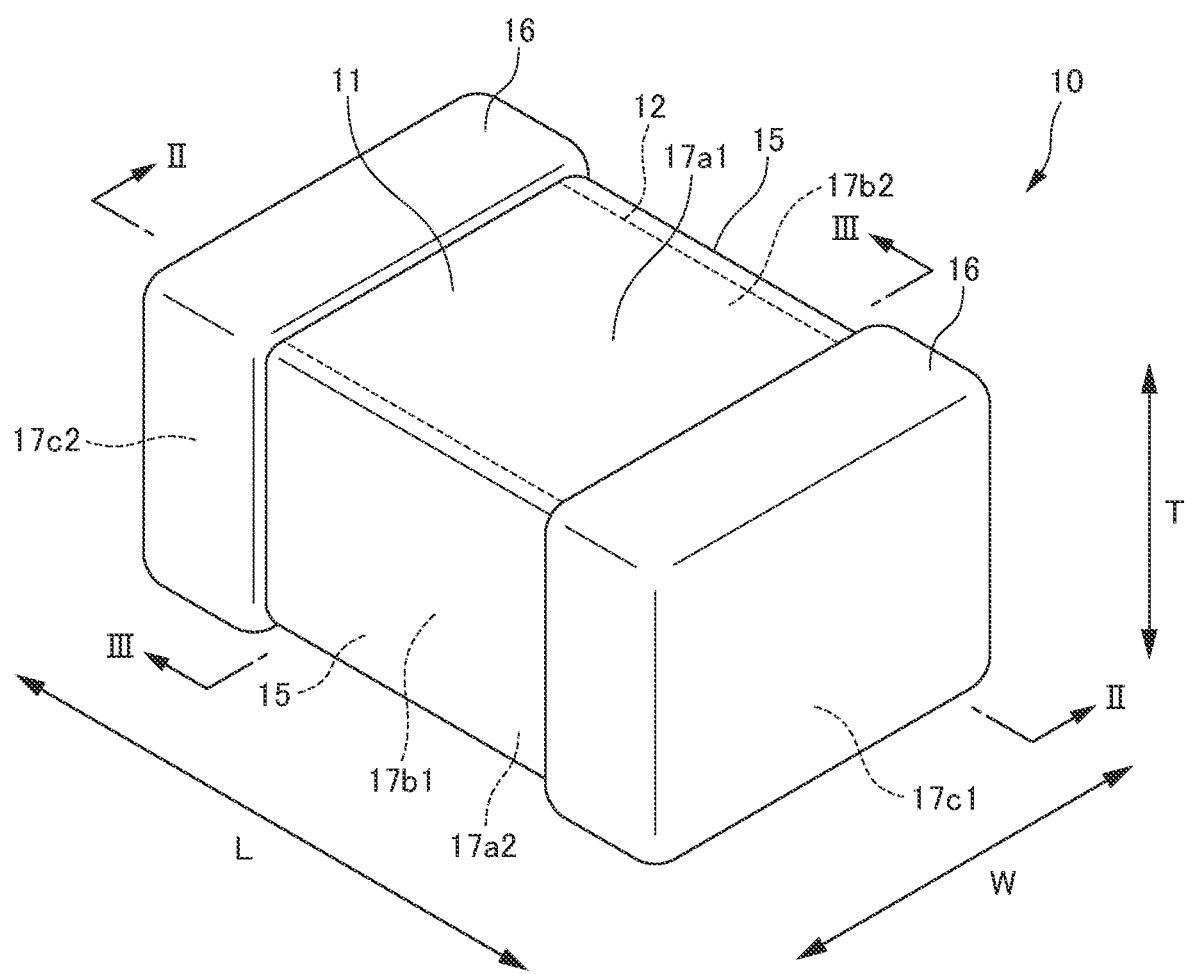
FIG. 1 is a schematic perspective view of a multilayer ceramic capacitor according to a preferred embodiment of the present invention.
Figure 2:
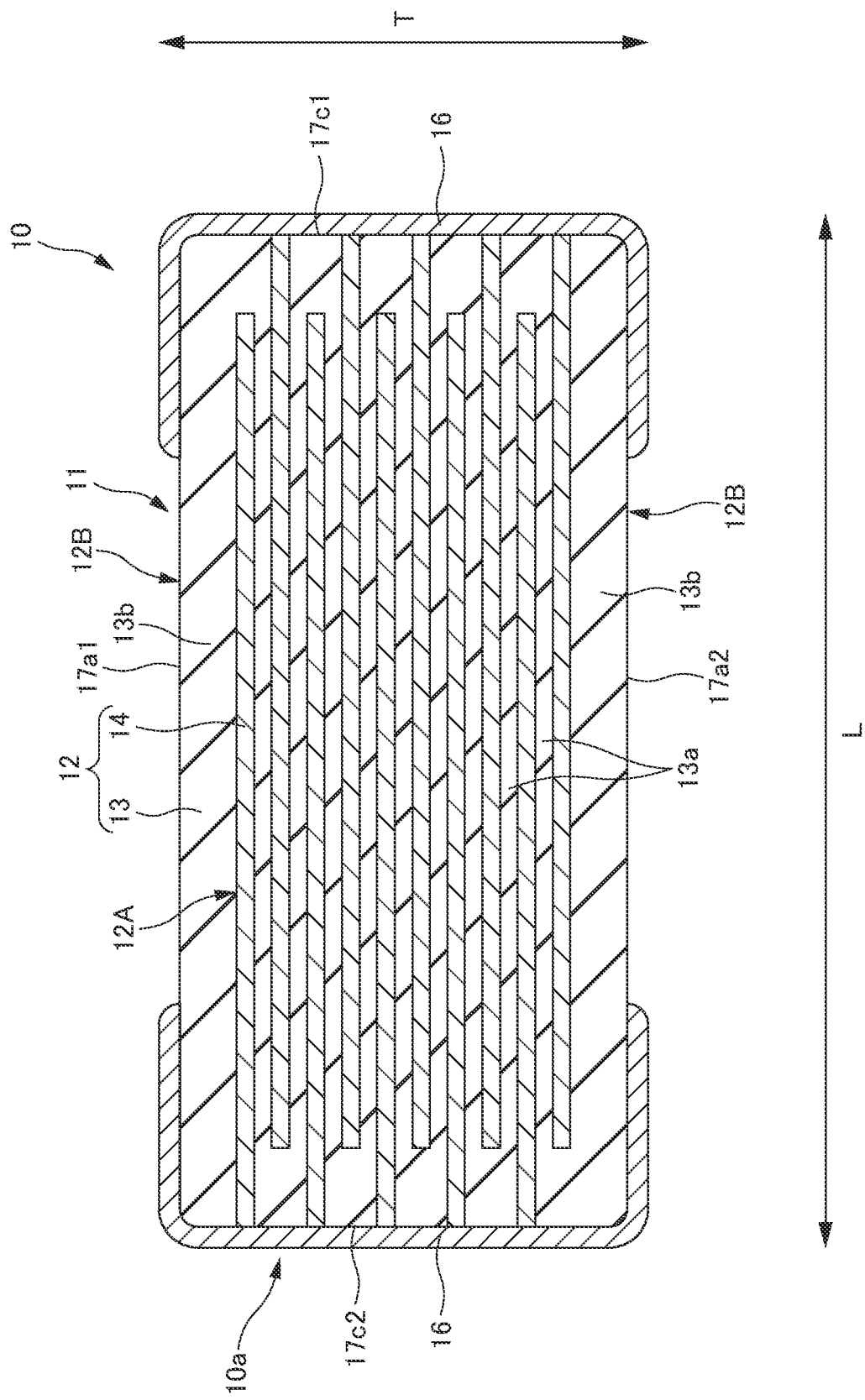
FIG. 2 is a cross-sectional view taken along the line II-II in FIG. 1.
Figure 3:
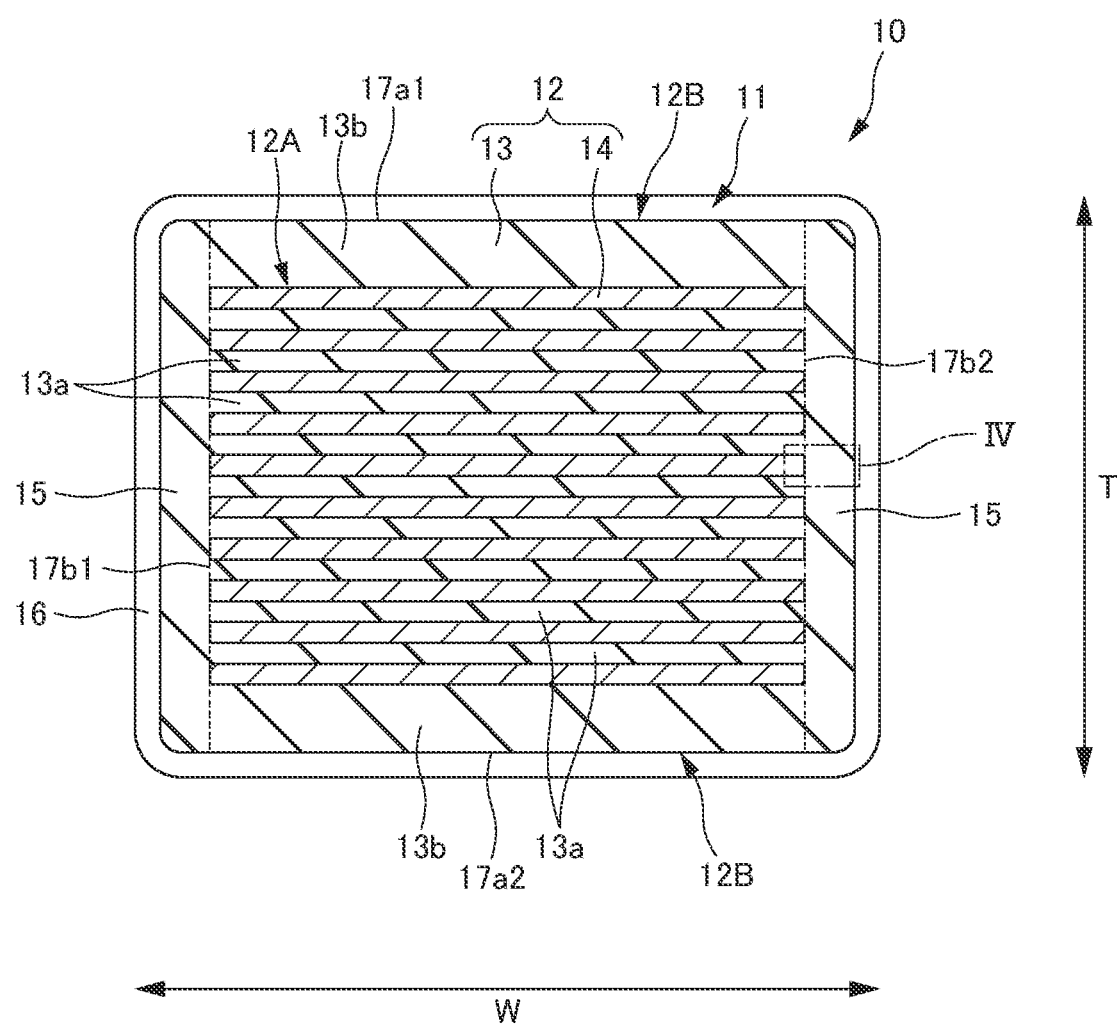
FIG. 3 is a cross-sectional view take along the line III-III in FIG. 1.

FIG. 1 is a schematic perspective view of a multilayer ceramic capacitor 10 according to a preferred embodiment of the present invention. FIG. 2 is a cross-sectional view taken along the line II-II shown in FIG. 1. FIG. 3 is a cross-sectional view taken along the line III-III shown in FIG. 1.

As shown in FIG. 1, the multilayer ceramic capacitor 10 of the present preferred embodiment is an electronic component having a rectangular parallelepiped or substantially rectangular parallelepiped shape. The multilayer ceramic capacitor 10 includes a base body 11, and a pair of external electrodes 16.

Figure 4:
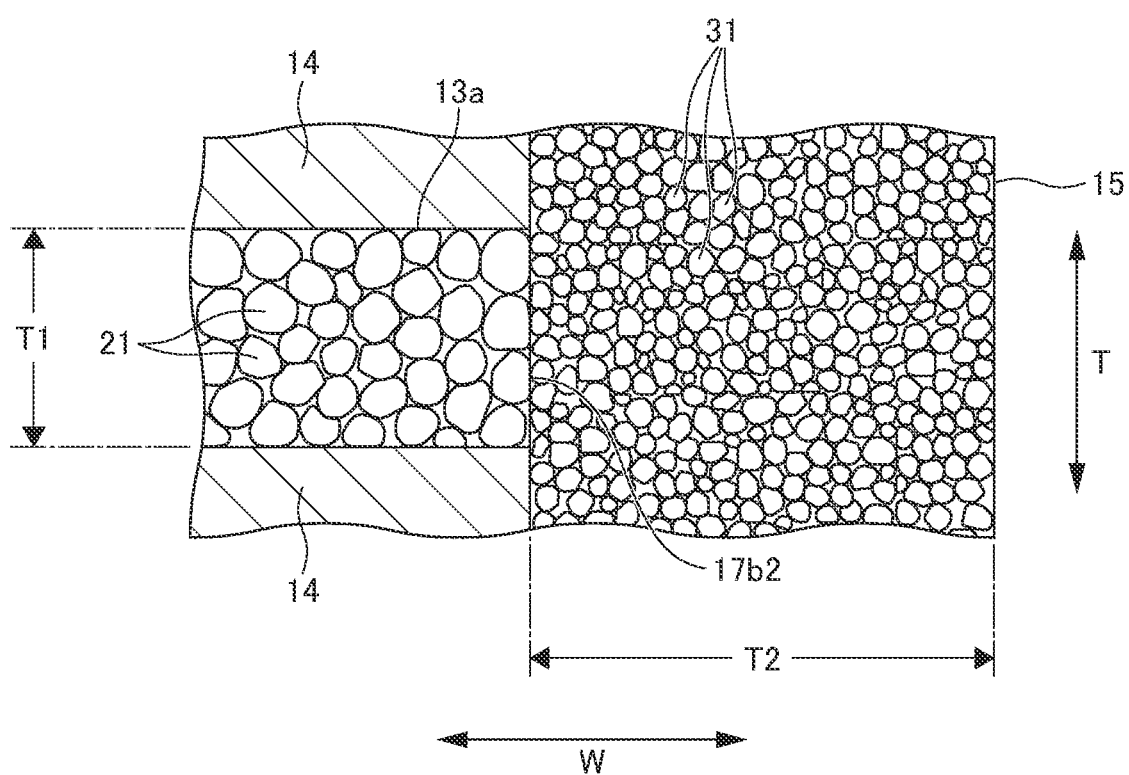
FIG. 4 is an enlarged view of a portion IV in FIG. 3.
Figure 5:
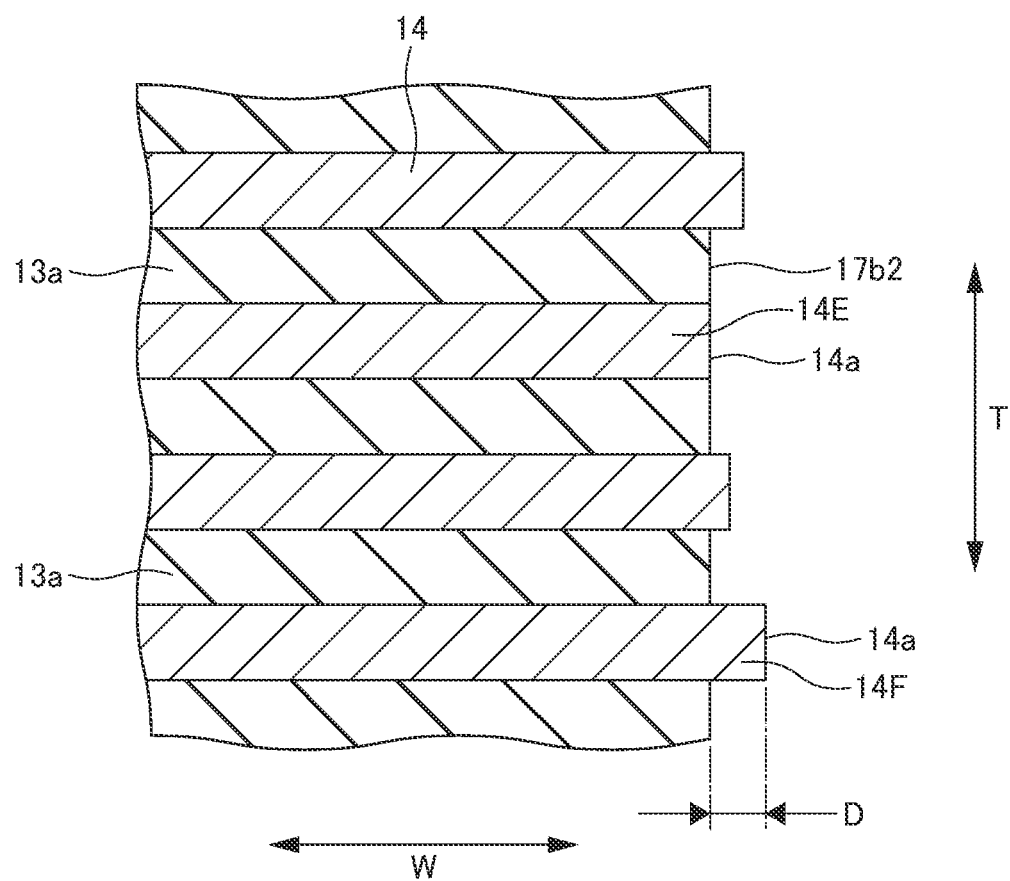
FIG. 5 is a cross-sectional view showing the amount of deviation at a side surface of internal electrode layers of a multilayer body including dielectric ceramic layers according to a preferred embodiment of the present invention.

In FIGS. 1 to 3, the arrow T indicates the lamination (stacking) direction of the multilayer ceramic capacitor 10 and the base body 11. In FIGS. 1 and 2, the arrow L indicates a length direction perpendicular or substantially perpendicular to the lamination direction (T) of the multilayer ceramic capacitor 10 and the base body 11. In FIGS. 1 and 3, the arrow W indicates a width direction perpendicular or substantially perpendicular to the lamination direction (T) and the length direction (L) of the multilayer ceramic capacitor 10 and the base body 11. It should be noted that the lamination direction (T) and the width direction (W) are also shown in FIGS. 4 and 5.

As shown in FIGS. 1 and 2, a pair of external electrodes 16 are spaced apart from each other, and cover the outer surfaces of both ends in the length direction (L) of the base body 11. The pair of external electrodes 16 each include a conductive film.

The pair of external electrodes 16 each include a laminated film including, for example, a sintered metal layer and a plated layer. The sintered metal layer is formed by firing a paste such as, for example, Cu, Ni, Ag, Pd, Ag—Pd alloy, and Au. The plated layer includes, for example, a Ni-plated layer and a Sn-plated layer covering the Ni-plated layer. The plated layer may be, for example, a Cu-plated layer or an Au-plated layer instead of these layers. Furthermore, the pair of external electrodes 16 may include only the plated layer. Furthermore, a conductive resin paste can be used as the pair of external electrodes 16.

As shown in FIGS. 2 and 3, the base body 11 includes a multilayer body 12 including a plurality of dielectric ceramic layers 13 and a plurality of internal electrode layers 14 stacked alternately along the lamination direction (T), and a pair of additional dielectric ceramic layers 15 covering both side surfaces of the multilayer body 12 in the width direction (W). The additional dielectric ceramic layers 15 may be referred to as side gap portions. The multilayer body 12 has the lamination direction (T), the length direction (L), and the width direction (W), which are the same as those of the multilayer ceramic capacitor 10 and the base body 11.

The dielectric ceramic layers 13 and the additional dielectric ceramic layers 15 are formed by firing a ceramic material including barium titanate as a main component, for example. The dielectric ceramic layers 13 and the additional dielectric ceramic layers 15 may be made of other high dielectric constant ceramic materials such as, for example, those mainly including $CaTiO_3$, $SrTiO_3$, $CaZrO_3$ or the like. The ceramic material included in the dielectric ceramic layers 13 and the additional dielectric ceramic layers 15 includes additives such as, for example, Si, Mg, Mn, Sn, Cu, rare earth, Ni and Al, for the purpose of adjusting the composition.

The internal electrode layers 14 are each made of a metal material such as, for example, Ni, Cu, Ag, Pd, Ag—Pd alloy, and Au. The internal electrode layers 14 may be made of other conductive materials which are not limited to these metal materials.

As shown in FIG. 2, one of the pair of internal electrode layers 14, which are adjacent to each other in the lamination direction (T) and have the dielectric ceramic layer 13 interposed therebetween, is electrically connected to one of the pair of external electrodes 16 in the multilayer ceramic capacitor 10. The other one of the pair of internal electrode layers 14, which are adjacent to each other in the lamination direction (T) and have the dielectric ceramic layer 13 interposed therebetween, is electrically connected to the other one of the pair of external electrodes 16 in the multilayer ceramic capacitor 10. In this way, a plurality of capacitor elements are electrically connected in parallel the pair of external electrodes 16.

As shown in FIGS. 2 and 3, the dielectric ceramic layer 13 includes a plurality of first dielectric ceramic layers 13a sandwiched between the internal electrode layers 14, and a pair of second dielectric ceramic layers 13b that are provided on both sides in the lamination direction (T) and larger in thickness than the first dielectric ceramic layers 13a.

As shown in FIGS. 2 and 3, the multilayer body 12 includes an inner layer portion 12A in which each of the plurality of internal electrode layers 14 is opposed with the first dielectric ceramic layer 13a interposed therebetween, and a pair of outer layer portion 12B that sandwich the inner layer portion 12A in the lamination direction (T). In other words, in the inner layer portion 12A, the plurality of internal electrode layers 14 are alternately laminated with the first dielectric ceramic layers 13a interposed therebetween.

Furthermore, the multilayer body 12 includes a first main surface 17a1 and a second main surface 17a2 opposed to each other in the lamination direction (T), a first side surface 17b1 and a second side surface 17b2 opposed to each other in the width direction (W), and a first end surface 17c1 and a second end surface 17c2 opposed to each other in the length direction (L).

At each of the first end surface 17c1 and the second end surface 17c2 of the multilayer body 12, ends on one side in the length direction (L) of the internal electrode layers 14 to be connected to the external electrode 16 are exposed. On the other hand, at each of the first side surface 17b1 and the second side surface 17b2 of the multilayer body 12, ends on both sides in the width direction (W) of the internal electrode layers 14 are exposed.

As shown in FIG. 3, at the first side surface 17b1 and the second side surface 17b2 of the multilayer body 12, the additional dielectric ceramic layers 15 cover each of the first side surface 17b1 and the second side surface 17b2.

The multilayer ceramic capacitor 10 of the present preferred embodiment is manufactured, for example, such that a ceramic material such as, for example, a ceramic green sheet, etc. that defines and functions as the dielectric ceramic layers 13 and a conductive material such as, for example, a conductive paste, etc. that defines and functions as the internal electrode layers 14 are laminated to form the multilayer body 12, and a ceramic material such as, for example, a ceramic green sheet, etc. that defines and functions as the additional dielectric ceramic layers 15 is laminated on the first side surface 17b1 and the second side surface 17b2 of the multilayer body 12. Furthermore, each material defining and functioning as the multilayer body 12 and the additional dielectric ceramic layers 15 is fired, following which the external electrodes 16 are formed by, for example, firing, plating or the like, to manufacture the multilayer ceramic capacitor 10.

FIG. 4 is an enlarged view of a portion indicated by IV in FIG. 3, and shows an end portion in the width direction (W) of the internal electrode layers 14, the first dielectric ceramic layer 13a provided between the internal electrode layers 14, and the additional dielectric ceramic layers 15 in contact with the internal electrode layers 14 and the second side surface 17b2 of the dielectric ceramic layer 13a.

The first dielectric ceramic layer 13a includes dielectric particles 21 derived from the material of the first dielectric ceramic layer 13a. In addition, the additional dielectric ceramic layer 15 includes dielectric particles 31 derived from the material of the additional dielectric ceramic layers 15.

In the present preferred embodiment, the thickness T1 of the first dielectric ceramic layer 13a in the lamination direction (T) is, for example, about 0.48 µm or more and about 0.50 µm or less. On the other hand, the thickness T2 of the additional dielectric ceramic layer 15 in the width direction (W) is, for example, about 10 µm or more and about 15 µm or less.

In the present preferred embodiment, it is preferable that the number of dielectric particles 21 in the first dielectric ceramic layer 13a in the thickness direction corresponding to the lamination direction (T) is three or more and six or less, for example. On the other hand, it is preferable that the number of dielectric particles 31 present in the additional dielectric ceramic layer 15 in the thickness direction corresponding to the width direction (W) is 100 or more and 150 or less, for example.

Furthermore, the number of dielectric particles 21 in the first dielectric ceramic layer 13a in the thickness direction corresponding to the lamination direction (T) is defined as $N_T$. Furthermore, the number of dielectric particles 31 in the additional dielectric ceramic layer 15 in the thickness direction corresponding to the width direction (W) is defined as $N_W$. It is preferable that the ratio of $N_T$ to $N_W$ is about 1:23.08 or more and about 1:46.15 or less, for example. In other words, for example, it is preferable that the number $N_W$ is about 23.08 or more and about 46.15 or less when the number $N_T$ is 1.

For example, as a specific example, the thickness T2 of the additional dielectric ceramic layer 15 is about 18,000 nm, and the average particle size of the dielectric particles 31 in the additional dielectric ceramic layer 15 and located on the straight line from the center or approximate center to the side surface in the middle in the thickness direction is about 130 nm. In this case of the specific example, the number $N_W$ of dielectric particles 31 in the thickness direction of the additional dielectric ceramic layer 15 is about 138.462 by calculation. On the other hand, when the number $N_T$ of the dielectric particles 21 in the first dielectric ceramic layer 13a in the thickness direction located on the straight line in the lamination direction at the center portion in the width direction, thickness direction, and the length direction is three or more and six or less. Therefore, the ratio in the number of particles of $N_T$ to $N_W$ is about 1:23.08 or more and about 46.15 or less.

Therefore, in the present preferred embodiment, the average particle size of the dielectric particles 21 included in the first dielectric ceramic layer 13a is significantly larger than the average particle size of the dielectric particles 31 contained in the additional dielectric ceramic layer 15. In the present specification, the average particle size indicates a circular equivalent particle size (volume D50 diameter) having an integrated number distribution of about 50% when image analysis is performed by a scanning electron microscope (SEM) in a predetermined region.

In the present preferred embodiment, as shown in FIG. 5, the maximum deviation amount in the width direction (W) of edges 14a of all of the internal electrode layers 14 on the second side surface 17b2 of the multilayer body 12 is, for example, preferably about 0.5 µm or less. The same applies to the first side surface 17b1 of the multilayer body 12, and the maximum deviation amount in the width direction (W) of the edges of the internal electrode layers 14 may be about 0.5 µm or less, for example.

The maximum deviation amount referred to herein is a difference D in the width direction (W) between the inner most edge 14a (14E in FIG. 5) of the internal electrode layer 14, and the outer most edge 14a (14F in FIG. 5) in the width direction (W) of the internal electrode layer 14.

In the present preferred embodiment, when both of the first dielectric ceramic layer 13a and the additional dielectric ceramic layer 15 include Mg, for example, it is preferable that the content of Mg included in the additional dielectric ceramic layer 15 is greater than the content of Mg included in the first dielectric ceramic layer 13a. Furthermore, even when the first dielectric ceramic layer 13a does not include Mg, it is preferable that the additional dielectric ceramic layer 15 includes Mg.

Mg has an advantageous effect of reducing or preventing the grain growth of the dielectric ceramic layer during firing. Therefore, by adjusting the content of Mg included in the dielectric ceramic layer, the size of the particles included in the dielectric ceramic layer can be adjusted. When the content of Mg included in the additional dielectric ceramic layer 15 is greater than the content of Mg included in the first dielectric ceramic layer 13a, it is possible to easily adjust the ratio of the number of the dielectric particles 21 in the first dielectric ceramic layer 13a in the thickness direction corresponding to the lamination direction (T), to the number of dielectric particles 31 in the additional dielectric ceramic layer 15 in the thickness direction corresponding to the width direction (W).

In addition, in the present preferred embodiment, it is possible to manufacture a small-size multilayer ceramic capacitor 10 with an overall dimension having the length of about 0.40 mm or more and about 0.60 mm or less in the length direction (L), the length of about 0.20 mm or more and about 0.30 mm or less in the width direction (W), and the length of about 0.20 mm or more and about 0.50 mm or less in the lamination direction (T), for example.

The multilayer ceramic capacitor 10 according to the present preferred embodiment described above exhibits the following advantageous effects.

(1) The multilayer ceramic capacitor 10 according to the present preferred embodiment includes the multilayer body 12 including the dielectric ceramic layers 13 and the internal electrode layers 14 which are laminated in the lamination direction (T), and the external electrodes 16 each connected to the internal electrode layers 14, the multilayer body 12 further including the first main surface 17a1 and the second main surface 17a2 opposing each other in the lamination direction (T), the first side surface 17b1 and the second side surface 17b2 opposing in the width direction (W) which is perpendicular or substantially perpendicular to the lamination direction (T), the first end surface 17c1 and the second end surface 17c2 opposing each other in the length direction (L) perpendicular or substantially perpendicular to the lamination direction (T) and the width direction (W), the inner layer portion 12A including the internal electrode layers 14 laminated alternately with the dielectric ceramic layers 13 interposed therebetween, and the outer layer portions 12B that sandwich the inner layer portion 12A in the lamination direction (T), the dielectric ceramic layers 13 including the first dielectric ceramic layers 13a laminated with the internal electrode layers 14 interposed therebetween in the inner layer portion 12A, and the second dielectric ceramic layers 13b defining and functioning as the outer layer portions 12B, the multilayer ceramic capacitor 10 further including the additional dielectric ceramic layers 15 respectively on the first side surface 17b1 and the second side surface 17b2 and sandwiching the inner layer portion 12A and the outer layer portions 12B in the width direction (W), the first dielectric ceramic layers 13a each having the thickness T1 of about 0.48 μm or more and about 0.50 μm or less in the lamination direction (T), the additional dielectric ceramic layers 15 each having the thickness T2 of about 10 μm or more and about 15 μm or less in the width direction (W), the number of dielectric particles 21 in each of the first dielectric ceramic layers 13a in a thickness direction corresponding to the lamination direction (T) is three or more and six or less, the number of dielectric particles 31 in each of the additional dielectric ceramic layers 15 in a thickness direction corresponding to the width direction (W) is 100 or more and 150 or less, and, when the number of dielectric particles 21 in each of the first dielectric ceramic layers 13a in a thickness direction corresponding to the lamination direction (T) is defined as $N_T$, and the number of dielectric particles 31 present in each of the additional dielectric ceramic layers 15 in a thickness direction corresponding to the width direction (W) is defined as $N_W$, the ratio of $N_T$ to $N_W$ is about 1:23.08 or more and about 1:46.15 or less.

With such a configuration, it is possible to achieve higher capacitance by making the particle size of the dielectric particles 21 included in the first dielectric ceramic layer 13a larger. On the other hand, since the dielectric particles 31 included in the additional dielectric ceramic layer 15 are small in particle size, the entire surface area becomes larger, and the interface defining and functioning as the surface area also becomes larger, such that moisture resistance is improved. As a result, it is possible to achieve both high capacitance and reliability, while achieving a reduction in size.

(2) In the multilayer ceramic capacitor 10 according to the present preferred embodiment, the average particle size of the dielectric particles 21 included in each of the first dielectric ceramic layers 13a is larger than the average particle size of the dielectric particles 31 included in each of the additional dielectric ceramic layers 15. With such a configuration, it is possible to achieve higher capacitance.

(3) In the multilayer ceramic capacitor 10 according to the present preferred embodiment, the maximum deviation amount in the width direction (W) of the edges 14a of the internal electrode layers 14 serving as the first side surface 17b1 and the second side surface 17b2 of the multilayer body 12 is about 0.5 μm or less.

With such a configuration, the first side surface 17b1 and the second side surface 17b2 of the multilayer body 12 become flat, and when the additional dielectric ceramic layer 15 is attached to the first side surface 17b1 and the second side surface 17b2, it is possible to attach the additional dielectric ceramic layer 15 to the flat surface without irregularity.

(4) In the multilayer ceramic capacitor 10 according to the present preferred embodiment, the additional dielectric ceramic layers 15 each include Mg, and the content of Mg included in the additional dielectric ceramic layer 15 is greater than the content of Mg included in each of the first dielectric ceramic layers 13a.

With such a configuration, it is possible to easily adjust the ratio of the number of the dielectric particles 21 in the first dielectric ceramic layer 13a in the lamination direction (T), to the number of dielectric particles 31 in the additional dielectric ceramic layer 15 in the width direction (W).

(5) The multilayer ceramic capacitor 10 according to the present preferred embodiment has overall dimensions of a length of about 0.40 mm or more and about 0.60 mm or less in the length direction (L), a length of about 0.20 mm or more and about 0.30 mm or less in the width direction (W), and a length of about 0.20 mm or more and about 0.50 mm or less in the lamination direction (T).

With such a configuration, it is possible to achieve both high capacitance and reliability, while achieving a reduction in size.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a multilayer body including dielectric ceramic layers and internal electrode layers laminated in a lamination direction; and
   external electrodes each connected to the internal electrode layers; wherein
   the multilayer body further includes:
   a first main surface and a second main surface opposing each other in the lamination direction;
   a first side surface and a second side surface opposing in a width direction which is perpendicular or substantially perpendicular to the lamination direction;
   a first end surface and a second end surface opposing each other in a length direction perpendicular or substantially perpendicular to the lamination direction and the width direction;
   an inner layer portion including the internal electrode layers laminated alternately with the dielectric ceramic layers interposed therebetween; and
   outer layer portions sandwiching the inner layer portion in the lamination direction;
   the dielectric ceramic layers include first dielectric ceramic layers laminated with the internal electrode layers interposed therebetween in the inner layer portion, and second dielectric ceramic layers defining and functioning as the outer layer portions;
   the multilayer ceramic capacitor further includes additional dielectric ceramic layers respectively on the first side surface and the second side surface and sandwiching the inner layer portion and the outer layer portions in the width direction;
   the first dielectric ceramic layers each have a thickness of about 0.48 μm or more and about 0.50 μm or less in the lamination direction;
   the additional dielectric ceramic layers each have a thickness of about 10 μm or more and about 15 μm or less in the width direction;
   a number of dielectric particles in each of the first dielectric ceramic layers in a thickness direction corresponding to the lamination direction is three or more and six or less;
   a number of dielectric particles present in each of the additional dielectric ceramic layers in a thickness direction corresponding to the width direction is 100 or more and 150 or less; and
   when the number of dielectric particles in each of the first dielectric ceramic layers in the thickness direction is defined as $N_T$, and the number of dielectric particles in each of the additional dielectric ceramic layers in the thickness direction is defined as $N_W$, a ratio of $N_T$ to $N_W$ is about 1:23.08 or more and about 1:46.15 or less.

2. The multilayer ceramic capacitor according to claim 1, wherein an average particle size of the dielectric particles in each of the first dielectric ceramic layers is larger than an average particle size of the dielectric particles in each of the additional dielectric ceramic layers.

3. The multilayer ceramic capacitor according to claim 1, wherein a maximum deviation amount in the width direction of edges of the internal electrode layers defining and functioning as the first side surface and the second side surface of the multilayer body is about 0.5 μm or less.

4. The multilayer ceramic capacitor according to claim 1, wherein the additional dielectric ceramic layers each include Mg, and a content of Mg in the additional dielectric ceramic layer is greater than a content of Mg in each of the first dielectric ceramic layers.

5. The multilayer ceramic capacitor according to claim 1, wherein the multilayer ceramic capacitor has a dimension in the length direction of about 0.40 mm or more and about 0.60 mm or less in the length direction, a dimension in the width direction of about 0.20 mm or more and about 0.30 mm or less, and a dimension in the lamination direction of about 0.20 mm or more and about 0.50 mm or less.

6. The multilayer ceramic capacitor according to claim 1, wherein each of the external electrodes includes a laminated film including a sintered metal layer and a plated layer.

7. The multilayer ceramic capacitor according to claim 6, wherein the sintered metal layer includes at least one of Cu, Ni, Ag, Pd, Ag—Pd alloy, and Au.

8. The multilayer ceramic capacitor according to claim 6, wherein the plated layer includes a Ni-plated layer and a Sn-plated layer covering the Ni-plated layer.

9. The multilayer ceramic capacitor according to claim 1, wherein each of the dielectric ceramic layers includes barium titanate as a main component.

10. The multilayer ceramic capacitor according to claim 9, wherein each of the dielectric layers includes at least one of Si, Mg, Mn, Sn, Cu, rare earth, Ni, or Al as an additive.

11. The multilayer ceramic capacitor according to claim 1, wherein each of the internal electrodes includes at least one of Ni, Cu, Ag, Pd, Ag—Pd alloy, or Au.

\* \* \* \* \*